US006226760B1

(12) United States Patent
Burkhardt et al.

(10) Patent No.: US 6,226,760 B1
(45) Date of Patent: May 1, 2001

(54) METHOD AND APPARATUS FOR DETECTING FAULTS

(75) Inventors: Rainer Burkhardt, Leonberg; Herbert Strobel, Oberboihingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/161,592

(22) Filed: Sep. 28, 1998

(30) Foreign Application Priority Data

Sep. 26, 1997 (DE) ........................................ 197 42 446

(51) Int. Cl.[7] ........................................ H02H 3/05

(52) U.S. Cl. ........................ 714/33; 714/38; 714/48; 703/14; 703/17; 703/22

(58) Field of Search ........................ 714/33, 38, 32, 714/27–28, 47, 48; 703/4, 14, 17, 22, 28

(56) References Cited

U.S. PATENT DOCUMENTS

| | | | |
|---|---|---|---|
| 4,740,969 | 4/1988 | Fremont | 311/12 |
| 5,161,158 | 11/1992 | Chakravarty et al. | 371/15.1 |
| 5,276,619 | 1/1994 | Ohara et al. | 364/424.04 |
| 5,293,387 | 3/1994 | Booth | 371/26 |
| 5,532,927 | 7/1996 | Pink et al. | 364/424.03 |

FOREIGN PATENT DOCUMENTS

| | | |
|---|---|---|
| 39 06 318 A1 | 8/1989 | (DE) . |
| 41 06 717 C1 | 12/1992 | (DE) . |
| 0 348 080 A2 | 12/1989 | (EP) . |
| 0 629 773 A1 | 12/1994 | (EP) . |

*Primary Examiner*—Norman M. Wright
(74) *Attorney, Agent, or Firm*—Evenson, McKeown, Edwards & Lenahan, P.L.L.C.

(57) ABSTRACT

A fault diagnostic apparatus for the recognition of defective components of a technical system with fault-relevant process variables contains a diagnostic module which has a checklist and a table of predetermined conditions (in memory). The conditions are determined by a component fault simulation in a generated model of the operation of the system. The checklist provides a primary process variable and secondary process variables affected thereby, and the table of conditions gives for each combination of fault-relevant process variables, the corresponding components suspected of being faulty. During the operation of the system, the diagnostic module detects the condition values of the primary process variables and, upon the occurrence of a fault condition therein, activates a diagnostic process in which it compares the actual condition combination with the one stored in the table of conditions. If upon comparison, the fault conditions are the same, the diagnostic module identifies the correspondingly stored suspected component.

10 Claims, 5 Drawing Sheets

| | |
|---|---|
| CL_1 | A |
| CL_1 | Ua |
| CL_1 | Ia |
| CL_1 | B |
| CL_1 | Ub |
| CL_1 | Ib |

| CHECKLIST PORTIONS | A | A | A | A | A | A | A | A | A | A | A | A | A |
|---|---|---|---|---|---|---|---|---|---|---|---|---|---|
| : | | | | | | | | | | | | | |
| CL_1 | 1 | 0 | 1 | 0 | 0 | 0 | S1 | S2 | ca | | La | | M |
| CL_1 | 1 | 0 | 1 | 0 | 1 | 0 | | | | 1 | | | M |
| CL_1 | 1 | 1 | 1 | 0 | 1 | 1 | | | ca | | La | | |
| : | | | | | | | | | | | | | |

ZT

METHOD AND APPARATUS FOR DETECTING FAULTS

BACKGROUND AND SUMMARY OF THE INVENTION

This application claims the priority of 197 42 466.5, filed Sep. 26, 1997, the disclosure of which is expressly incorporated by reference herein.

The invention relates to a method and apparatus for detecting faults in components of a technical system. The apparatus uses fault-relevant process data whose condition, upon encountering a corresponding component fault, changes from a no fault condition to a fault condition when its condition value departs from a given tolerance.

Various types of fault diagnostic apparatus are known for the detection, identification and display of defective components of a production plant, a computer system, a motor vehicle, etc. Usually, the momentary actual condition values of the process variables of the system (which are composed of input values, output values and internal condition values) are detected and compared with given set values. If the momentary actual value differs from the set value by a given amount, the momentary value is evaluated and displayed as a fault. In electrical or electronic systems the evaluation can usually be performed directly by appropriate electronic means, for example, comparators, window discriminators, and the like. In some cases, in systems involving a mechanical factor, the corresponding process variables are converted by a measuring converter to an electrical signal which can be then evaluated by comparison.

One difficulty of such known apparatus is that the expression relating to the fault location or the nature of the fault is often ambiguous. Here, due to a lack of sensory equipment, the apparatus associates several possible component faults with a single fault signal. It is subsequently up to the operating personnel to make an evaluation of the fault display in order to find the correct and unequivocal one out of several or a number of possible fault signals. It is furthermore known to automatically determine the nature and location of a fault by a corresponding investment in sensing equipment and to then indicate the pertinent fault information. This fault information is in a coded or uncoded format and, if necessary, can be made usable for correction by operating or service personnel.

German Patent Document 41 24 542 C2 describes a fault diagnostic system for determining the cause of a fault in a apparatus under test, which system has a memory and a detecting system which detects the parameters of the apparatus under test. Stored in the memory system is a selection tree with nodes which correspond to the particular subunits of the apparatus under test, as well as test tables associated with the nodes, in which at least one parameter is supplied that is to be found by the detector system. Further stored in the memory system is a test condition relating thereto, plus a fault probability table corresponding to the results of tests according to at least one test condition, and names of slave nodes. In addition, at least two parameters to be detected and test conditions are given in a test table which is associated with a node having at least three slave nodes. Moreover, a search/interference system is stored beforehand in the memory system, and selects nodes along the selection tree and evaluates the corresponding test tables. Here, the nodes are chosen according to the result of the evaluation of the test tables. This is intended to achieve a targeted association of individual test tables by the search/interference system in the manner of a non-binary selection tree. The structure of the selection tree correspond to the hardware organization of the apparatus under test. This system requires relatively fast computations during the system's running time, since many decisions are to be made, and in some cases tables have to be reloaded.

U.S. Pat. No. 5,099,436 discloses a method and an apparatus for performing a system fault diagnosis which is based on a hybrid display of knowledge of the system to be diagnosed. Data obtained during the running time of the system are compared with an event-based system representation comprising a plurality of predefined events. An event is recognized when the data detected correlate to the critical parameters of the event. The recognized event and a corresponding set of ambiguous group S effects are analyzed, which characterize components which are to be re-sorted in an ambiguous group in accord with an associated sorting effect. Furthermore, a symptomatic fault model and a NOT function model can be analyzed in order to determine the symptomatic relationships and the nature of the NOT functions which are applicable to the running of the system. Each applicable symptom fault relationship and each kind of NOT function is associated with a set of ambiguity group effects which re-sorts the ambiguity group. Beginning with the component in the ambiguity group whose NOT function is the most probable, a structure model is analyzed. As a result of this analysis, proposals for repair are output with tests to be performed on the system.

This known procedure involves a current comprehensive data acquisition and constant comparison operations during system operation, and therefore a considerable amount of mathematical operations in the diagnostic section of the system. The system model describes the system components in an event structure with additional information on their probability of failure, ease of repair, accessibility, etc. The implementation of this diagnostic knowledge (for which special knowledge and/or experience are necessary) is not suitable for use where the systems to be diagnosed are subject to short-term changes in structure and character (as is the case in motor vehicles, for example).

Structural outlines for a computer-assisted fault diagnosis system for a motor vehicle are described in the following publication: N. Waleschkowski et al., Ein wissenbasiertes Fahrzeug-Diagnosesystem for den Einsatz in der Kfz-Werkstatt, Grundlagen und Anwendungen der känstlichen Intelligenz [A Knowledge-Based Diagnostic System for Use in the Automotive Industry, Bases and Applications of Artificial Intelligence] Zeitschrift künstliche Intelligenz KI 1/95, page 55. This system contains a diagnosis preparatory stage with a knowledge base which contains a structural model on the hierarchical construction of the technical system composed of individual secondary systems, and an effectiveness model on the effective relationships between the individual secondary systems. This system also contains a fault model which determines the course of the diagnosis and which shows the relationships between causes of faults and their effects as well as appropriate testing and repairs. A diagnosis performance stage interactively performs fault diagnoses by using the diagnosis program offered in the preparatory stage of the diagnosis.

An object of the present invention is to provide a method and fault diagnostic system (of the kind referred to above) with which system components which are suspected of faults can be recognized relatively fast, with comparatively few computing operations.

This and other objects and advantages are achieved by the method and fault diagnostic system according to the invention, in which upon the failure of a system component, i.e., upon the occurrence of a component fault, certain process factors known as "fault-relevant" factors will change their condition from a no-fault condition to a fault condition. As a result, it becomes possible from their condition to determine the one or more components suspected of being faulty. This binary condition decision for the particular process factor is performed according to whether the corresponding condition factor of the process variable lies within or outside of a preset tolerance range.

Furthermore, use can be made of the fact that knowledge of the operation of resources which are used not only by a fault signal path but also by one or more other signal paths can substantially reduce the number of the suspected components in the fault path.

For every component fault, the process variables are divided into primary process variables (those having values that depart from an established tolerance) and secondary process variables (those which are influenced by the primary process variables and which specify the component fault without actually departing from their tolerance, but collectively are indicative of the fault in question). While the system is running, a change of primary process variables from their no-fault condition to their fault condition, trigger a diagnosis process wherein the other (secondary process) variables are scanned. The primary and the corresponding secondary process variables and their combination conditions indicating component faults can be determined beforehand and stored in a table of conditions, based on models obtained by automated simulation from existing design documents. By means of the model it is possible automatically, and without the need for recourse to technical or special knowledge, to record a detailed association of the causes and effects of faults. To the extent that the system to be diagnosed contains independent function groups, it can be divided up accordingly for the modeling, which reduces the number of simulations needed.

In an embodiment of the fault diagnostic apparatus according to the invention, the diagnostic module is designed so that it indicates the system components suspected of faults during a diagnosis, in an order of probability of failure that has been established empirically. Thus the operating and service personnel are in a position to deal with the fault first by the action that is most likely to eliminate it.

In another embodiment of the fault diagnostic apparatus embodied according to the invention, the diagnostic module stores in a diagnosis memory (for the particular diagnosis) the information on the primary triggering process variable, the detected combination of fault-relevant process variables and the corresponding system components suspected of faults, to thereby document the fault that has occurred and its cause.

In still another embodiment according to the invention, the system is used to draw upon preceding diagnostic procedures stored in the diagnosis memory for information during a diagnosis in progress when the conditions of the fault process variables are being located and then evaluated. In the scope of such an evaluation, several proposals may have been given of sets of system components suspected of faults. Here, the best proposal determined by means of an appropriate, conventional algorithm is used. In this manner faults which have occurred in the past, for example, and for the moment are no longer present because the corresponding signal path is not active, can be included in the evaluation. This leads to an improvement of diagnostic results.

Other objects, advantages and novel features of the present invention will become apparent from the following detailed description of the invention when considered in conjunction with the accompanying drawings.

DETAILED DESCRIPTION OF THE DRAWINGS

Figure 1:
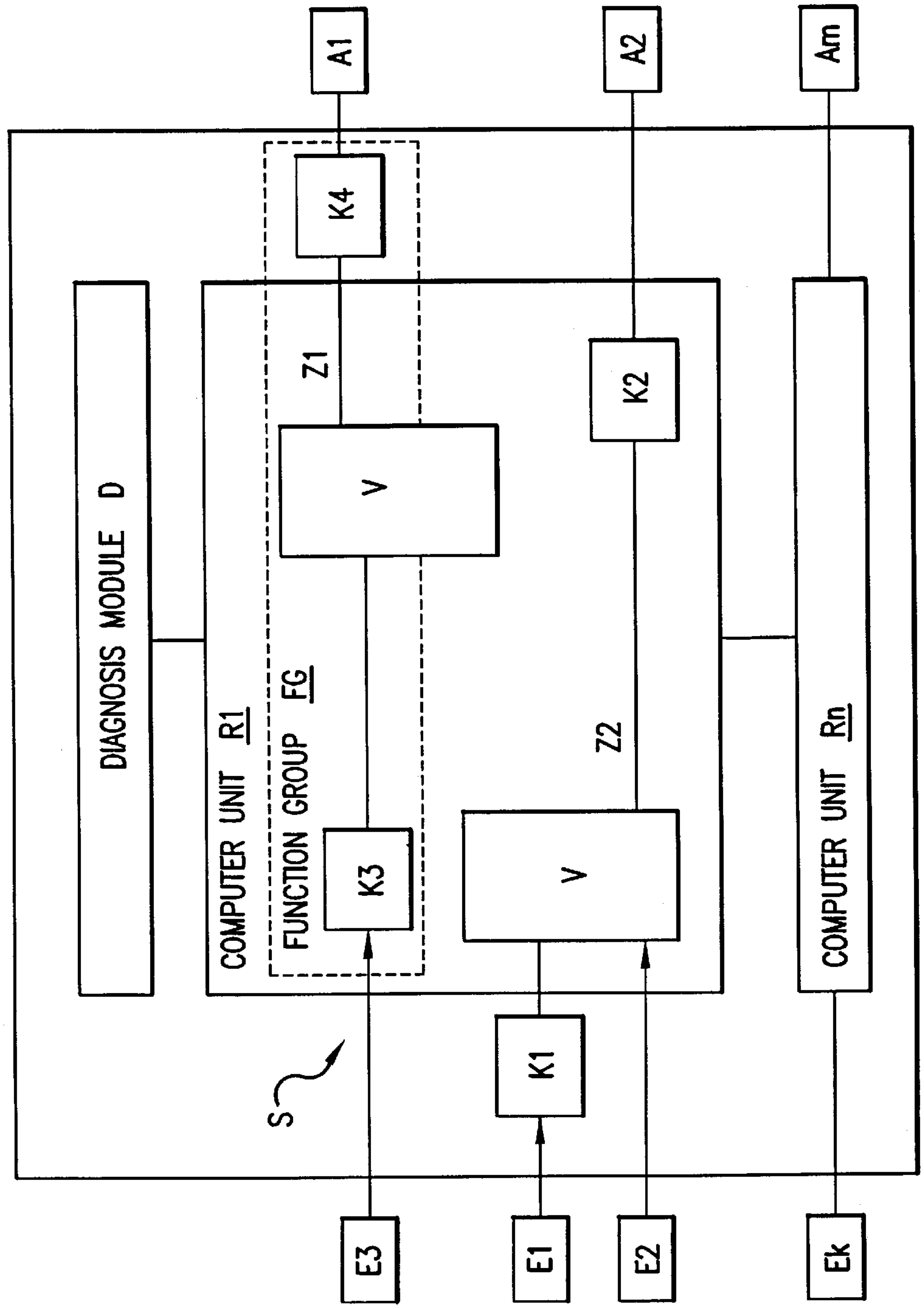
FIG. 1 shows a block diagram of a system to be diagnosed for faults in its components, and of a diagnostic module of a corresponding fault diagnostic apparatus.

FIG. 1 shows generally the structure of a technical system S that is to be diagnosed, and which comprises a number n of computer units R1, . . . , Rn, of which only a first computer unit R1 is shown in some detail. The system S produces, by means of processing logic V, which are implemented in the computer units R1, . . . , Rn, condition variables Z1 and Z2, as well as output variables Al, A2, . . . , Am according to the particular condition of input variables E1, . . . , Ek. A diagnostic module D is coupled to system S as a central component of a fault diagnostic apparatus which monitors the many different components K1 to K4 present in system S for faults. The system components can be disposed inside or outside of the computer units R1, . . . , Rn. The total of the input variables E1, . . . , Ek, the condition variables Z1, Z2, . . . and output variables A1, . . . , Am, forms the set of process variables of system S.

Figure 2:
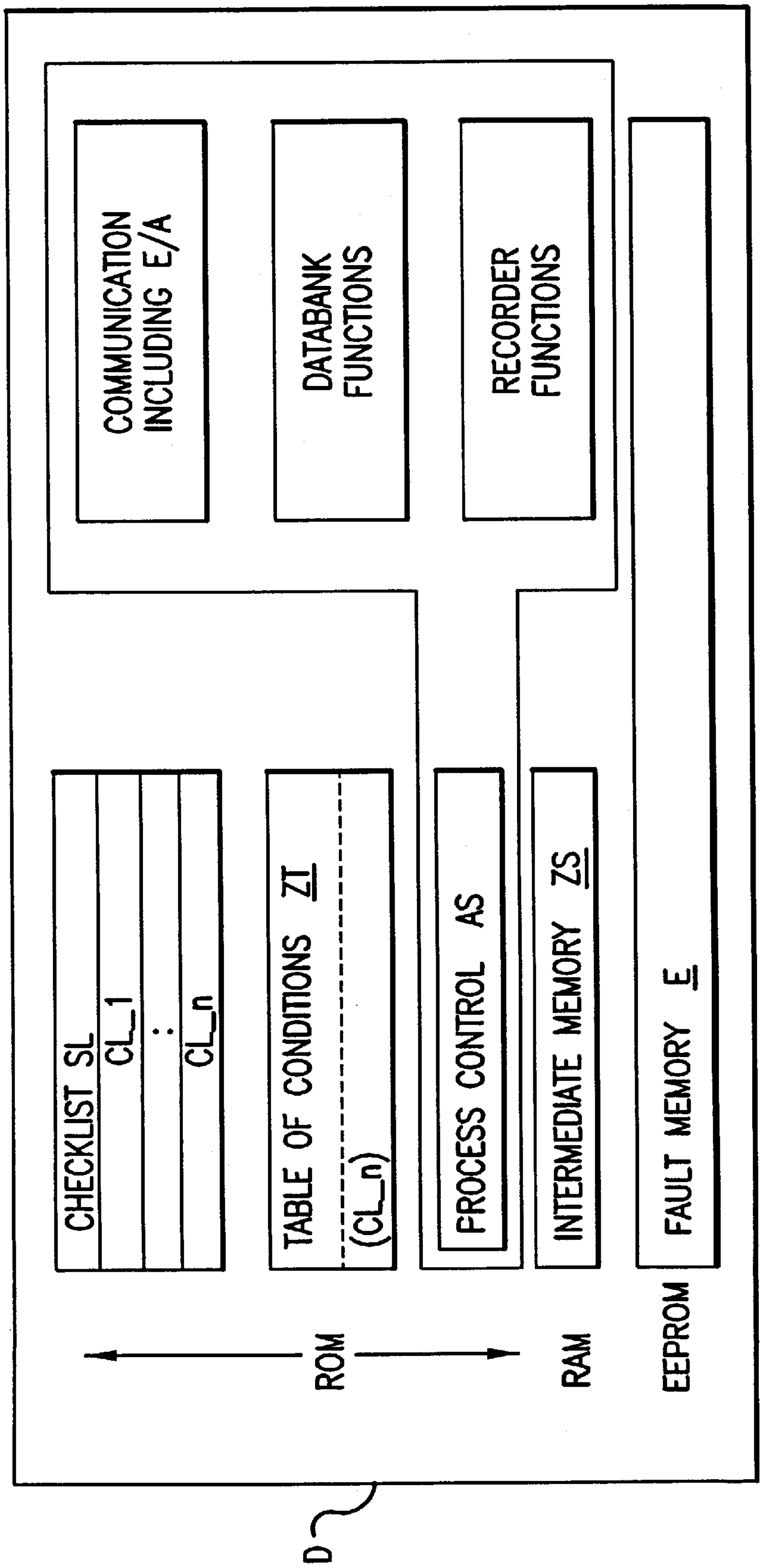
FIG. 2 a detailed block diagram of the diagnostic module of FIG. 1.

FIG. 2 shows the structure of the diagnostic module D. The diagnostic module D comprises a checklist CL which consists of individual check list portions CL_1, . . . , CL_n which contain particular fault-relevant process variables for the individual function groups FG, a process variable condition table ZT which documents the relationship of changes occurring in the condition of process variables to the system components suspected of faults and a process control AS. The checklist CL and the condition table ZT are obtained prior to the actual operation of the system in a generating phase and stored in the diagnostic module D. The process control AS contains, as represented by block diagram, the communication and data bank functions necessary for the fault diagnosis as well as a recorder function by which all inoperative conditions or faults recognized by the diagnostic module D in system components are stored in a correct chronological order in a fault memory E which functions as a diagnostic finding memory.

In addition, the diagnostic module D contains an intermediate memory ZS.

Especially for the purpose of modeling (explained below), the system functions in the framework of the generating phase.

Here, the independently operating function paths are obtained in system S as particular function groups FG. As is shown in FIG. 1., this is performed for a particular function group FG which includes a component K3 that receives the input variable E3, a processing logic V connected thereto which produces a condition variable Zi, and a component K4 which follows processing logic V (outside of the corresponding computer unit R1). The condition variable Z1 is fed to the component K4, which produces therefrom the starting variable A1.

Figure 3:
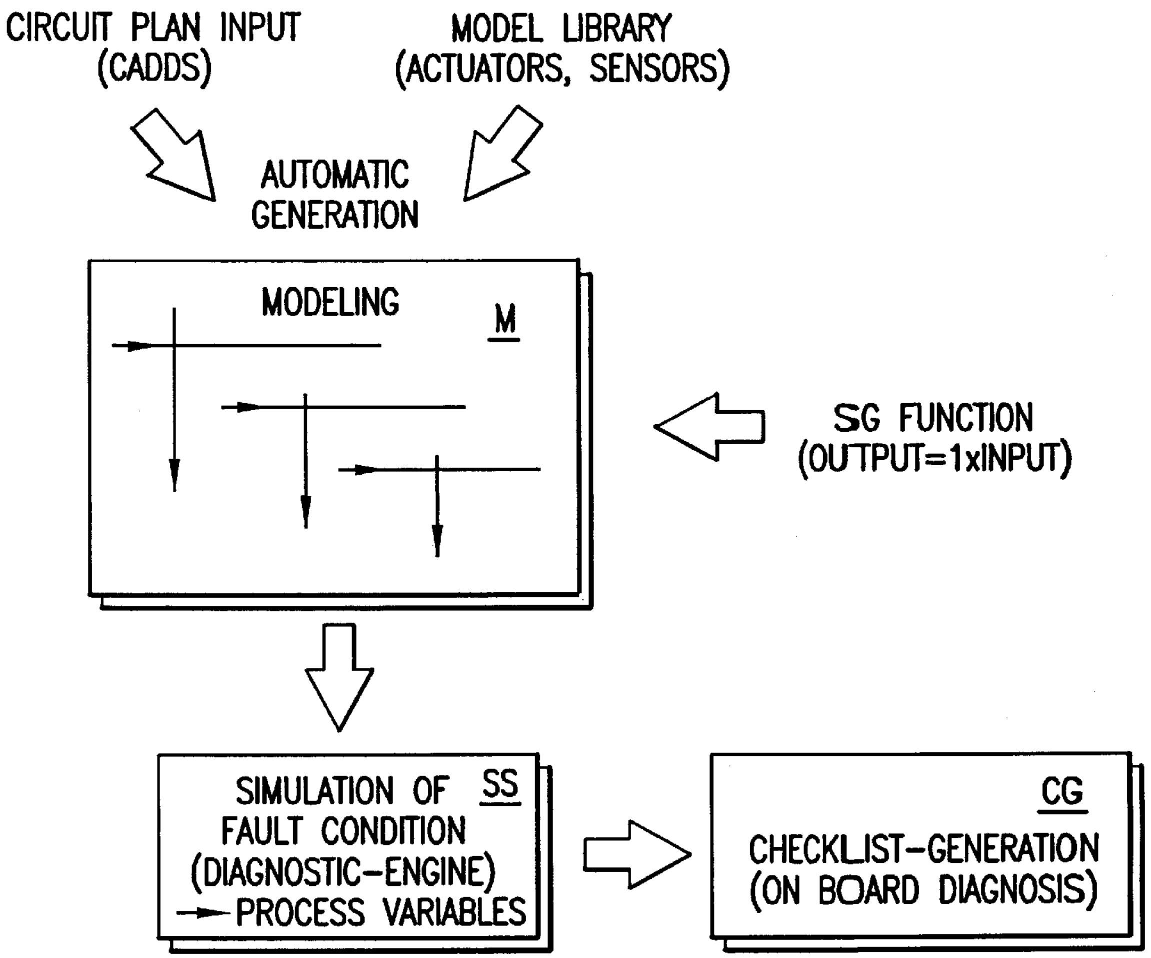
FIG. 3 a schematic block diagram to visualize the creation of an operating model of the system to be diagnosed in order to obtain a check list and a table of conditions for the diagnostic module of FIG. 2.

In this generating phase, a function model simulating the hardware and software structure of the function group FG is established by each of the function groups FG of system S, with the aid of corresponding software tools. As shown in FIG. 3, use is made for this purpose of especially related circuit plan inputs and data on actuators, sensors and the like, derived from a library of modes. Automatic generating processes of this kind are known and therefore do not require further explanation at this point.

Next, permutations of the relevant input variables E1, . . . $E_k$ are simulated (step SS) on the model M thus obtained, and all of the involved system components are assumed (one by one) to be defective. For each of such component faults, the corresponding process variables of the system S (where the condition values of which depart from a given tolerance due to the simulated component defects) are then determined. This is interpreted as a binary change of condition in the form of a shift from the fault-free condition to the fault condition of the process variables involved. These process variables are referred to as fault-relevant for the particular component fault.

Furthermore, in this simulation step SS the fault-relevant process variables of each component fault are divided into primary and secondary process variables. Those which by exceeding tolerances give concrete indications of faulty system components are called primary, while the other process variables, influenced by several primary process variables, are called secondary and lead only in their totality to a fault statement. Secondary process variables are also those which can exempt components which were initially suspected of defects, by making the fault picture more exact on the basis of the connecting structures.

In the checklist generating section CG that follows, the secondary process variables pertaining to a primary process variable are listed for the simulated component fault in a corresponding partial checklist. All of the partial checklists CL_1 to CL_n are then put together to form the checklist CL and are stored in the diagnostic module D. Subsequent to this, as the concluding step of the generating phase, the process variable condition table ZT, is created. In this condition table ZT, the one or more corresponding fault-suspected system components are associated with each combination of the binary conditions of the fault-relevant process variables. The condition table ZT obtained in this manner is then stored in the diagnostic module D.

Figure 4:
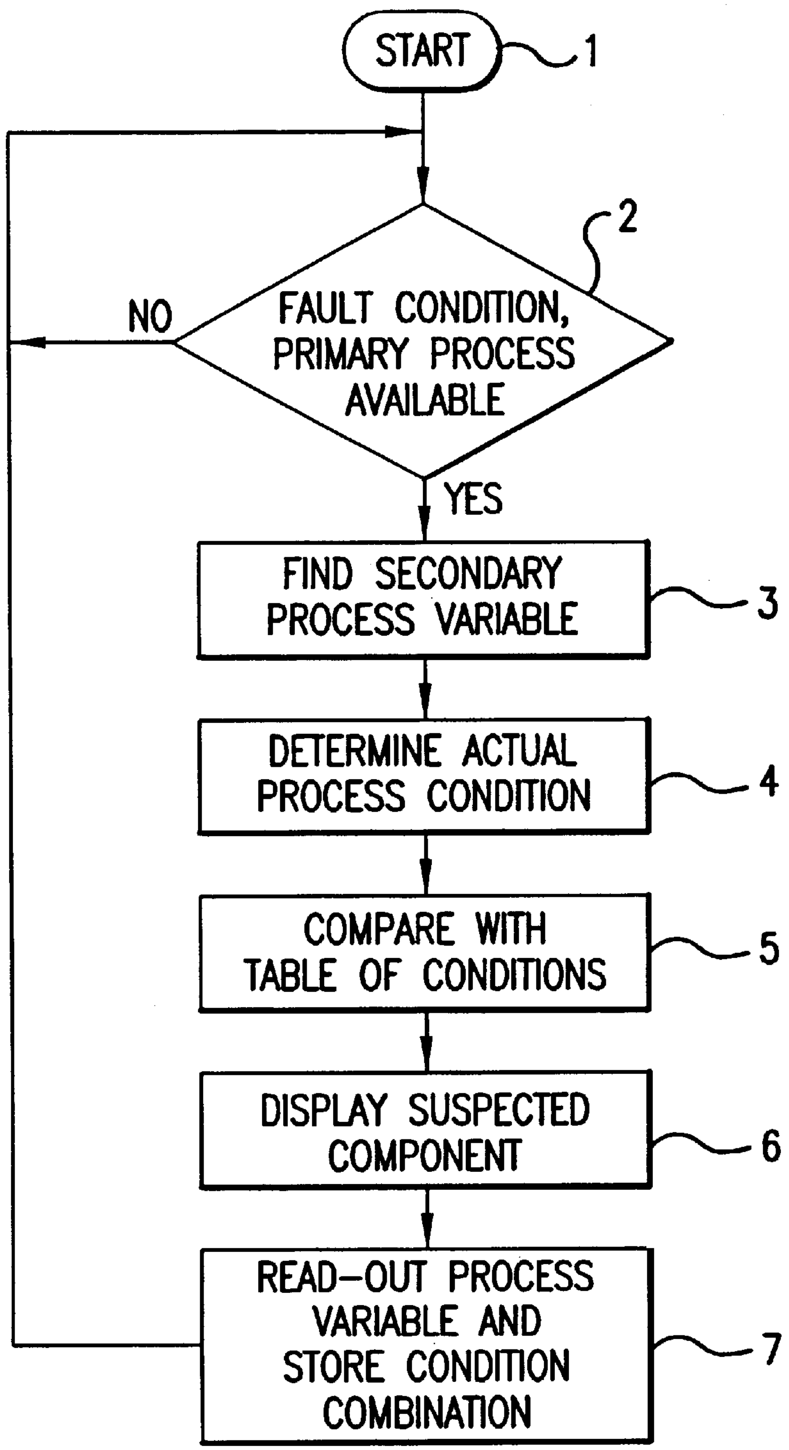
FIG. 4 a flow diagram of the fault diagnosis process that can be performed by the fault diagnostic system with the diagnostic module of FIG. 2.

With the diagnostic module D prepared in this manner, the fault diagnostic apparatus monitors the system S for the presence of defective components by the process shown in FIG. 4. In the system start 1, the diagnostic module D continuously reads the primary process variables, i.e., those process variables of the system S which constitute a primary process variable for at least one component fault. The momentary actual condition values of the primary process variables are evaluated by the diagnostic module D to see whether they have departed from the no-fault condition of the process variable and consequently the condition of the process variable has changed to the fault condition. When the diagnostic module D recognizes in the scanning step 2 that the condition of a fault-relevant primary process variable has changed to the fault condition, it triggers a further diagnostic procedure in which (in the next step 3) the diagnostic module D locates the partial checklist associated with the primary process variable that has changed to the fault condition. The diagnostic module D assumes from the partial checklist thus located, the corresponding other fault-relevant, secondary process variables of the function group FG that is involved. The diagnostic module D then obtains from system S the actual condition variables of these secondary process variables, and thus learns whether the secondary process variable in question is in the no-fault condition or in the fault condition (step 4).

In the next step 5 the diagnostic module D compares the present combination of the primary process variable, which initiated the diagnosis and was obtained by scanning the system, and the secondary process variables pertaining thereto, with the condition combinations stored in the condition table ZT. If the present condition combination scanned in the operation of the system corresponds to the condition combination stored in a certain line of the condition table ZT, the system components reported in this line of the condition table ZT as doubtful are read out by the diagnostic module D and displayed to the user as doubtful (step 6). In addition, the diagnostic module D then stores in the fault memory E the important information on the diagnosis process and the findings obtained therefrom (i.e., data on the primary process variable which initiated the diagnosis as well as the actual conditions of this process variable scanned by the system), combined with the corresponding secondary process variables. With the doubtful components displayed for them, the service or diagnostic staff are able to repair or replace the doubtful system components, or perform further more detailed tests on the doubtful components. The display of the doubtful components of the system is performed preferably in a series of diminishing fault probabilities, for which purpose an empirically determined probability is established.

In a preferred embodiment of the present invention, the data stored in the results memory on the results of previous diagnoses are used for the evaluation of an ongoing diagnosis. In particular, the condition combinations of previous component defects permit a reproduction of the system condition at a later point in time. If those primary process variables, which were already once in the fault condition at an earlier time and had initiated a diagnosis, are themselves scanned with regard to their present condition (as one of the secondary process variables pertaining to the primary process variable which has passed into the fault condition due to a present component fault and has started the current diagnosis), that condition can be used for evaluating which of these process variables was assumed faulty at the time of the diagnosis scan initiated by them. This evaluation includes the conditions of the corresponding process variables connected therewith. Subsequently, by this evaluation there may be several proposals of combinations of doubtful system components, one of which is used by a corresponding algorithm as the result of the best evaluated proposal. Such evaluation algorithms are familiar to one of skill in the art and need no further explanation here. With this procedure faults which have occurred in the past, and at the present time are no longer available because the corresponding path is not active., can be included in the evaluation so that (in many cases) the result of the diagnosis can be improved.

With the aid of FIGS. 5 to 7, some of the important aspects of the fault diagnostic apparatus generally described above and corresponding to FIGS. 1 to 4 will be explained concretely hereinafter (with the aid of an example of a function group FG of a motor vehicle as the system to be diagnosed). The entire vehicle to be diagnosed contains a series of electronic assemblies as well as electrical and mechanical components and peripheral assemblies connected with them in this vehicle. The electrical components, for example, light bulbs, can be operated electronically via appropriate drivers, and the mechanical components can be operated through electromechanical actuators, for example, electric motors, solenoid valves, relays and the like. The condition values of the process variables of this system, especially those of the electrical and mechanical components, and the performance of actuations are at least in some cases fed back by sensors to the electrical components. Furthermore, the electronic assemblies are likewise included in the diagnosis.

Figures 5, 6, 7:
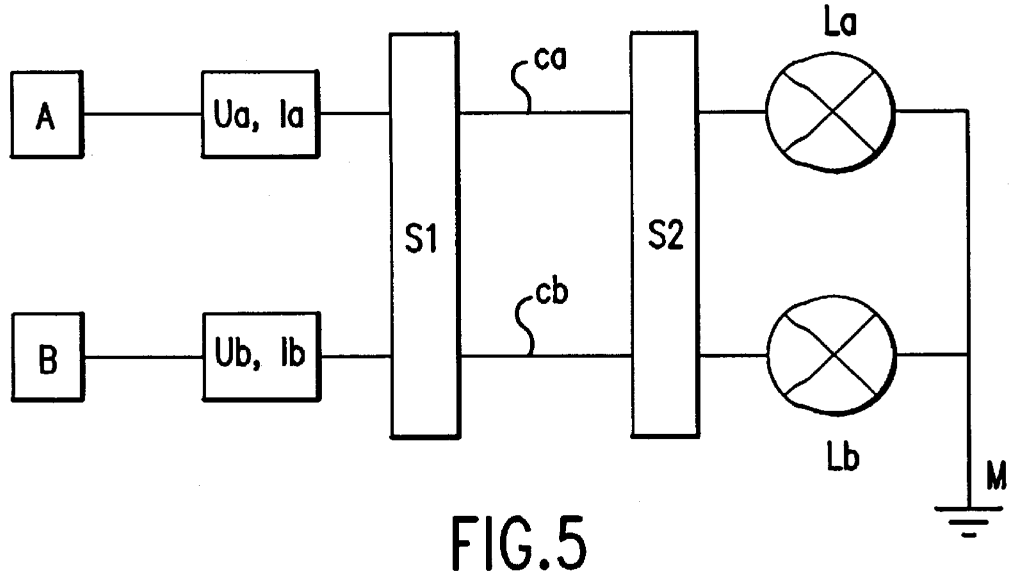
FIG. 5 a block diagram of a concrete embodiment of a function group according to FIG. 1 for the case of a motor vehicle as the system to be diagnosed.
FIG. 6 a portion of the check list of FIG. 3, which is stored in the diagnostic module for the function group of FIG. 5.
FIG. 7 a section of the table of conditions stored in the diagnostic module, pertaining to the function group of FIG. 5.

FIG. 5 shows a function group of this system, which comprises two current paths. A first current path contains an input variable A, the additional process variable voltage Ua and current Ia, a system component common to both paths in the form of a plug connector S1, a wire connection ca, a second common system component in the form of a second plug connector S2, a component in the form of a first lamp La and a ground connection M which is also common to both paths. The other current path contains an input variable B, the additional process variable voltage Ub and current intensity Ib, a conductive connection cb (as an additional system component), the plug connections S1 and S2, a second lamp Lb and the common ground connection M.

FIG. 6 shows a checklist portion belonging to this function group, which pertains to the presumption that the current Ia as a primary process variable has changed to the fault condition. This is manifested in an interruption of the first current path, so that no measurable current flows therein and the corresponding lamp La does not light. The partial checklist of FIG. 6 comprises, in addition to the current intensity Ia of the first current path acting as primary process variable for this component fault, the two input variables A and B, the two voltages Ua and Ub, and the current intensity Ib in the other current path.

FIG. 7 shows a section containing the present assumed fault, taken from the corresponding condition table ZT which visualizes the evaluation in the case of this fault. As can be seen from FIG. 5, the two current paths are connected to one another by the common plug connections S1 and S2 and the common ground connection M in a fault-irrelevant manner.

The first line of the condition table ZT shown in FIG. 7 shows that the indut variable A is active, the input variable B inactive, the voltage Ua active (i.e., measurable) and the current Ia inactive (i.e., not measurable) while the lamp La does not light. Furthermore, the corresponding voltage Ub and the corresponding current Ib are inactive. Consideration of this combination of the condition of the process variables shows, as indicated in the right half of the first line of the condition table ZT in FIG. 7, that all components of the first current path, i.e., the two plug connections S1 and S2, the conductor ca, the lamp La and the ground connection M, are considered. Nothing is expressed concerning the condition of the conductor cb, because these are not relevant to the fault that has occurred. The expression of the fault is therefore relatively vague. (That is there are several possible fault conditions, as indicated at the right side of the table.)

The second line of the condition table ZT of FIG. 7 shows that the input variable A is active, the input variable B inactive, the voltage Ua active and the current Ia inactive (i.e., not measurable) and again the lamp La does not light. In this case, however, the voltage Ub in the other current path is active (i.e., present), while the corresponding current Ib is measured as inactive. Consideration of this combined condition of the process variables shows that this fault can occur only when the common ground connection M is interrupted, since the voltage Ub is measured as active, while the input variable B is inactive. This is thus an unequivocal fault statement and, in the right half of this second line, only the ground connection M appears as a doubtful system component.

In the example of line 3 of the condition table ZT of FIG. 7, both input variables A and B and both voltages Ua and Ub are active, while the current Ia in the one current path is inactive and the current Ib in the other current path is active, i.e., the lamp Ib lights, but not lamp La. Consideration of this combined condition of the process variables shows that, due to the active current Ib and the lighting of the lamp Lb there is no interruption in the common ground connection M, nor in all 2C likelihood is there any at the two plug connections S1 and S2. Not included in this judgment is the case that, at the plug connections S1 and S2 only part of the contacts connects because, for example, the plug is not properly inserted into the corresponding socket. The only possible causes of fault are then only an interruption of the connecting line ca or a defective lamp La, as shown in the right half of the third line of the condition table ZT of FIG. 7. With a little additional cost a provision can also be made for the case of only a partial contact in the particular plug connection S1 and S2.

By considerations similar to the ones described above for a selected function group in conjunction with FIGS. 5 to 7, all the other independent function groups of a technical system to be diagnosed can be monitored for the occurrence of faults in one or more system components. The example of FIGS. 5 to 7 also shows how additional (three, for example) possible fault sources can be excluded by resorting to an additional process variable for judging them.

With its diagnosis module the diagnostic apparatus of the invention is capable of recognizing a system fault relatively quickly and at a relatively low cost, and identifying the component causing it. An advantage among others is the structuring of the fault-relevant process variable for a particular component fault into the measurable primary process variable connected therewith and the secondary process variables dependent thereon which are indirectly affected by the component fault. This structuring of the process variables makes it possible to continually monitor only the primary process variables in the system.

Only when a fault condition of a primary process variable occurs are the conditions of the corresponding secondary process variables scanned in the system and evaluated. By the prior determination and storage of the checklists and the condition table, doubtful system components can quickly be discovered and displayed by the diagnostic module with relatively little mathematical calculation, while the system is running, with the aid of the combination of the conditions of the primary and corresponding secondary process variables.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fault diagnostic apparatus having a diagnosis module for detection of defective components of a technical system characterized by fault-relevant process variables, a condition of which changes, upon an occurrence of a particular component fault, from a no-fault condition to a fault condition in that a condition value departs from a given tolerance, said diagnosis module comprising:

a memory;

a checklist stored in said memory; and a table of conditions stored in said memory; wherein the checklist and table of conditions are predetermined via fault simulation in a generated operational model of the technical system, during which the fault-relevant process variables are determined separately for a particular defective system component, based on primary process variables which depart from a given tolerance due to an occurrence of the fault in the particular defective system component, and on secondary process variables affected by the primary process variables;

the checklist provides a partial checklist for each primary process variable, which partial checklist indicates the secondary process variables, that are affected by the primary process variable;

the table of conditions identifies, for every combination of conditions, corresponding system components suspected of defects;

while the technical system is running the diagnosis module detects current condition values of the primary process variables, determines a condition of the current condition values based on primary process variables, and upon detection of a defective condition for one of the primary process variables, activates a diagnostic process in which it acquires from the checklist secondary process variables corresponding to a primary process variable in a fault condition; and the diagnosis module uses condition values of the secondary process variables from the technical system to obtain their present condition, compares a first combination of conditions of the fault-relevant process variables with a second combination of conditions stored in the table of conditions, and if the first combination of conditions matches the second combination of conditions stored in the table of conditions, identifies a suspected system component correspondingly stored in the table of conditions.

2. The apparatus according to claim 1, wherein the diagnostic module indicates system components found to be suspect during a particular diagnostic process, in an order of an empirically established probability for each system component.

3. The apparatus according to claim 1, wherein the diagnostic module stores in a diagnostic results memory, information obtained in a diagnostic process regarding an initiating primary process variable, a combination of conditions of learned fault-relevant process variables and corresponding system components suspected of being faulty.

4. The apparatus according to claim 2, wherein the diagnostic module stores in a diagnostic results memory, information obtained in a diagnostic process regarding an initiating primary process variable, a combination of conditions of learned fault-relevant process variables and corresponding system components suspected of being faulty.

5. The apparatus according to claim 3, wherein the diagnostic module uses, during an ongoing diagnosis process, information stored in the diagnostic results memory from previous diagnosis processes in an exploration and subsequent evaluation of a condition of the active fault-relevant process variables.

6. A method for detection of defective components of a technical system, comprising:

simulating a fault in a component using an operational model of the technical system to predetermine a checklist and a table of conditions in a memory of a diagnosis module, by determining separately, during such simulation, fault-relevant process variables for a particular defective system component based on primary process variables which depart from a given tolerance due to an occurrence of the fault in the system component and secondary process variables affected by the primary process variables during the simulation of the fault;

generating from the checklist a partial checklist for each particular primary process variable, which partial checklist indicates secondary process variables that are affected by the particular primary process variable;

identifying with the table of conditions, for every combination of conditions, corresponding system components suspected of defects; and while the technical system is running, using the diagnosis module to perform the further acts of:

detecting current condition values of the primary process variables;

determining a condition of the current condition values based on primary process variables, activating a diagnostic process to acquire from the checklist a secondary process variable corresponding to a primary process variable in a fault condition upon detection of a defective condition for one of the primary process variables, utilizing condition values of the secondary process variables from the technical system to obtain their present condition, comparing a first combination of conditions of the fault-relevant process variables with a second combination of conditions stored in the table of conditions; and identifying a suspected system component correspondingly stored in the table of conditions if the first combination of conditions matches the second combination of conditions stored in the table of conditions.

7. The method according to claim 6, comprising the further act of:

indicating via the diagnostic module, system components found to be suspect during a particular diagnostic process, in an order of an empirically established probability for each system component.

8. The method according to claim 7, further comprising the act of:

storing, via the diagnostic module, in a diagnostic results memory, information found in a particular diagnostic process regarding initiating primary process variables, a combination of conditions of learned fault relevant process variables and corresponding system components suspected of being faulty.

9. The method according to claim 8, further comprising the act of:

storing, via the diagnostic module, in a diagnostic results memory, information found in a particular diagnostic process regarding initiating primary process variables, a combination of conditions of learned fault relevant process variables and corresponding system components suspected of being faulty.

10. The method according to claim 8, further comprising the act of:

utilizing with the diagnostic module and during an ongoing diagnosis process, information stored in the diagnosis results memory from previous diagnosis processes in an exploration and subsequent evaluation of a condition of the active fault-relevant process variables.

* * * * *